(12) United States Patent
Köhler et al.

(10) Patent No.: US 6,896,855 B1
(45) Date of Patent: May 24, 2005

(54) MINIATURIZED TEMPERATURE-ZONE FLOW REACTOR

(75) Inventors: Johann Michael Köhler, Golmsdorf (DE); Andreas Mokansky, Dresden (DE); Siegfried Poser, Jena (DE); Torsten Schulz, Jena (DE)

(73) Assignee: Institut fuer Physikalische Hochtechnologie e.V., Jena (DE)

( * ) Notice: Subject to any disclaimer, the term of this patent is extended or adjusted under 35 U.S.C. 154(b) by 0 days.

(21) Appl. No.: 09/600,694

(22) PCT Filed: Feb. 10, 1999

(86) PCT No.: PCT/EP99/01014

§ 371 (c)(1),
(2), (4) Date: Jul. 21, 2000

(87) PCT Pub. No.: WO99/41015

PCT Pub. Date: Aug. 19, 1999

(30) Foreign Application Priority Data

Feb. 11, 1998 (DE) .......................... 198 05 350

(51) Int. Cl.[7] .................. B01J 8/00; B01J 8/04
(52) U.S. Cl. .................. 422/191; 422/188; 422/191; 422/193; 422/195; 422/198
(58) Field of Search ................ 422/188, 189, 422/191, 193, 195, 198, 199

(56) References Cited

U.S. PATENT DOCUMENTS

| | | | | |
|---|---|---|---|---|
| 4,523,036 A | * | 6/1985 | Cornils et al. | ............... 568/454 |
| 4,532,028 A | * | 7/1985 | Peterson | ...................... 588/207 |
| 5,270,183 A | | 12/1993 | Corbett et al. | ............. 435/91.2 |
| 5,534,328 A | * | 7/1996 | Ashmead et al. | ........... 428/166 |
| 5,875,385 A | * | 2/1999 | Stephenson et al. | ........ 423/260 |

FOREIGN PATENT DOCUMENTS

| | | |
|---|---|---|
| DE | 4435107 | 4/1995 |
| WO | WO 92/13967 | 8/1992 |
| WO | WO 94/21372 | 9/1994 |
| WO | WO 96/10456 | 4/1996 |
| WO | WO 97/14497 | 4/1997 |

OTHER PUBLICATIONS

James Darnell; Harvey Lodish; David Baltimore Molekulare Zellbiologie Walter de Gruyter; Berlin; New York, 1994.

* cited by examiner

Primary Examiner—Alexa Doroshenk
(74) Attorney, Agent, or Firm—Jordan and Hamburg LLP

(57) ABSTRACT

A miniaturized temperature-zone flow reactor, used for thermally controlled biochemical or molecular-biological processes, especially polymerase chain reaction (PCR) enables more efficient reactions by providing at least one closed flow path which is divided into three partial paths (A1 . . . An; B1 . . . Bn and BB1 . . . BBn–1; C1 . . . Cn) with the reactor having three substrate chips (A; B; C) which are made of a material having a high heat conductivity, and which have defined channel sections that are spaced apart relative to each other, and are connected by a connecting chip (V) made of a poor heat-conductive material. The substrate chips (A; B; C) are maintained at different temperatures by various means, including the use of controlling heating elements in contact with the chips.

11 Claims, 2 Drawing Sheets

MINIATURIZED TEMPERATURE-ZONE FLOW REACTOR

BACKGROUND OF THE INVENTION

The invention relates to a miniaturized temperature-zone flow reactor used for thermally controlled biochemical and molecular-biological respectively, in particular for the method of the so-called polymerase chain reaction, referred to as PCR in the following, in which definite sequences out of a mixture of DNA-sequences are amplified.

When carrying out thermally controlled biochemical and molecular-biologic processes, respectively, very often different temperatures are required to be applied to the processing steps. Such an applying of changing temperatures are of particular importance with the so-called PCR.

The method of PCR has been developed in the recent years for amplifying definite DNA-sequences, and its principles have been specified by Darnell, J.; Lodish, H.; Baltimore, D. in "Molekular Zellbiologie, Walter de Gruyter, Berlin-New York 1994, p. 256/257". It is an essential, inter alia, with said method that mixtures of DNA-sequences are subjected to a definite changing temperature treatment. Thereby stationary sample treatment equipment is used, in which the respective samples are filled into sample chambers and are then periodically subjected to a heat-cold temperature cyclic treatment in the course of which, depending on the definitely pre-set primers, the desired DNA-sequences are amplified. In this respect, the effectiveness of the sample chambers known up to now is considered as not being sufficient. For this reason there has recently been proposed a miniaturized sample chamber (Northrup et al, DNA Amplification with microfabricated reaction chamber, 7th International Conference on Solid State Sensors and Actuators, Transducers Proceedings 93 (June 1993, Yokohama, Japan), p. 924–26), which permits a four times faster amplification of the desired DNA-sequences compared to the prior arrangements. This sample chamber, which can take up to 50 ul sample fluid, consists of a structurized silicon cell having a longitudinal extension in an order of size of 10 mm which is closed, in a sample affecting direction, by a thin membrane, to which the corresponding temperature is applied by way of a miniaturized heating element. Also with this device the DNA-sequences to be amplified are inserted via micro-channels into the chamber, then they are subjected to a polymerase chain reaction, and subsequently removed. In spite of the advantages obtained by this device, it involves substantially the disadvantage that also this sample chamber has to be heated and cooled as a whole which only permits limited rates of temperature changes. Particularly, when further reducing the size of the sample, the parasitic heat capacity of the sample chamber and that of a necessary temper block, if any, becomes more weighty compared to the sample fluid, so that the possible high temperature cycle rates which are attainable, in principle, with small liquid volumes cannot be obtained, whereby the effectiveness of the method is comparatively low. Moreover, a comparatively expensive control system is necessary each time a constant temperature schedule for a same fluid is to be obtained, and the heating and cooling power provided are substantially consumed in the components surrounding the sample fluid rather than in the sample fluid itself.

Furthermore, there is known from U.S. Pat. No. 5,270,183 a thermo-cycler operating on the flow principle in which the sample fluid to be amplified is passed through a pipe that sequentially is once or multiply wound around a plurality of cylinders which are kept at different temperatures. Such an embodiment, in principle, permits an amplification of comparatively small amounts of samples, down to about 25 μl. The manipulation of such a device, however, is rather impracticable and requires a high production skill in the manufacture of such devices, so that they are completely unsuited for serial production.

A flow thermo-cycler described in WO96/10456, comes nearest to the present invention, in which structurizing technologies known from the so-called micro-system technology are used to provide a sample receiving chamber. This sample receiving chamber permits a dynamic sample treatment of even very small amounts of very expensive substances. The achievement of this proposed solution is that the sample partial volumes are subjected to a homogeneous temperature throughput in respectively provided heating and cooling zones, also resulting in an increase of the output with respect to the samples to be amplified. Furthermore, and due to the design depending omission of the heating and cooling procedures for the wall materials and the severe minimizing of the parasitic heat capacities and heat influences, not only the required expenditures for the control are considerably lower, but also the entire cycle of the process is substantially time-reduced. Thereby only as much heating and cooling power has to be fed in as can be transported in the stream of the sample fluid. Additionally, the embodiment of the thermo-cycler described in WO 96/10456 not only permits a continuous process control, but also a serial operation in which different substances can be sequentially introduced into the thermocycler without the danger of an interfering mixing with the sample which is still in the device. This solution, however, is disadvantageous because, on the one hand, there is required a very precise, structured procedure for manufacturing the membranes provided therein, and, on the other hand, due to the set-up of the device described there, the retention time of the sample fluid in the cooling zone ranges is undesiredly high, at least at partial passages, which can lead to the formation of undesired by-products when carrying out PCR.

SUMMARY OF THE INVENTION

It is an object of the present invention to provide a miniaturized temperature-zone flow reactor that permits the performance of thermally controlled biochemical and molecular-biological processes, respectively, in particular, the method of polymerase chain reaction, more effectively than the prior art.

The object is realized by an apparatus having the features of at least one closed, multifold, winding flow path, each having a plurality of microstructured channels and at least three partial paths, in a planar substrate; three substrate chips, made from silicon or a material having a thermal conductivity at least as high as that of silicon; each one of the three substrate chips having at least one face, of which at least a portion thereof contains some of the plurality of microstructured channels; heating elements, on each of the three substrate chips, for providing heating to at least that portion of each of the substrate chips containing some of the plurality of microstructured channels; a first one of the substrate chips having a plurality of inlets thereon, corresponding in number to a number of flow paths on the substrate chip; a third one of the substrate chips having a plurality of outlets thereon, corresponding in number to a number of flow paths on the substrate chip; each of the three substrate chips having n channel sections, each of the n channel sections having an inlet opening and an outlet opening, such that the inlet opening and the outlet opening of each of the channels are linearly positioned adjacent to one another on one side of a section of each substrate chip; a connecting chip, made from a material having a thermal conductivity that is lower than the thermal conductivity of the substrate chips, such as glass, especially Pyrex (borosilicate glass) glass, or is at least as low as that of glass; the connecting chip further having a first face, opposite to the heating elements, on which the first substrate chip and thed third substrate chip are positioned, the first substrate chip and the third substrate chip being spaced apart from one another on the first face of the connecting chip; a plurality of first passage openings on its the first face, each of the first passage openings leading to a corresponding passage extending through the connecting chip; a plurality of second passage openings, corresponding in total number to a total number of the plurality of first passage openings, in a second, opposite face of the connecting chip, such that each of the second passage openings is in fluid transporting communication with a corresponding one of the passages; and still further such that the inlet openings and the outlet openings of the first substrate chip and the third substrate chip are in fluid transporting communication with the first passage openings; and the second passage openings of the connecting chip are connected to one another by some of the microstructured channels in a second one of the three substrate chips, to form the partial paths on the second substrate chip, such that one closed flow path, having n passages through the three substrate chips is formed.

Other advantageous embodiments are covered by an apparatus having the features of return channels in the partial paths of the second substrate chip having a reduced cross-section for fluid flow relative to other ones of the n channels, such that a fluid flow velocity through the return channels is at least three times a fluid flow velocity through other ones of the n channels; and wherein the return channels are made of a thermally insulating lining, which insulates the return channels relative to the second substrate chip.

In certain embodiments, the thermally insulating lining is a polymer. In yet other embodiments, the connecting chip is made of an optically transparent material. In certain embodiments, the first substrate chip has a first inlet path, and the third substrate chip has a last outlet path, both of which paths are longer than other n partial channels on the substrate chips. In other embodiments, the microstructured channels and the partial paths of the at least one closed, multifold, winding flow path of the miniaturized temperature-zone flow reactor are sufficiently large to accommodate a volume of reactants fed to the reactor that are mixed together with a volume of a carrier that is chemically non-miscible with the reactants, such as oil, for transport through the reactor. According to still other embodiments, the second substrate chip has a second surface, facing away from the connecting chip, which second surface is in heat-conductive communication with a cooling element, distributed over an entirety of the second surface of the second substrate chip, for cooling the second substrate chip to a temperature lower than a temperature of the first and third substrate chips.

Due to the present invention there is realized a cyclic heating and cooling of solutions to different temperature stages in a continuos flow in a very narrow space (in the micrometer range), in order to enable carrying out three reactions, for example, denaturation, annealing and extension to DNS in a sample and, in particular, in several different samples. The sample, or samples, containing the reactants, is/are repeatedly transported by a carrier medium in sequential sections through a closed flow path, whereby the sequence and the identical treatment of the sample/s is maintained. In the course thereof, different samples can be successively injected without intermixing with one another and subsequently can be placed in an orderly arrangement in the sample chambers, which can also be arranged in a parallel according to the present device.

The invention provides for three micro-structured chips, which include channels. The chips are made of a material having good heat conduction properties in order to arrange a poorly heat conducting connection chip in such a way that at least one closed flow path is formed through all chips. Each of the micro-chips is subjected to a preselected temperature, which differs from that of the others. The inlet openings and the outlet openings of the heat-conducting chips are connected to the passage openings of the connecting chip in such a way that the sample fluid is permitted to travel from A to B to C and again back from A to B to C, whereby this process can be repeated n-multiple where n is the number of channel sections provided in the entry chip (A) and the exit chip (B). The chips kept to the respectively desired temperature are thereby alternatingly arranged around the connecting chip, so that the different temperature zones are thermally insulated from one another. Within each of the chips of an equal temperature zone the higher heat conductivity of the same leads to a homogeneous temperature distribution of the fluids passing the chips. Furthermore, heater structures and sensor structures are integrated by thin-film technology in the chip. External cooling can be restricted to the coldest zone. For this purpose, for example, a cooling unit may be provided. Peltier elements that can be designed according to thin-film techniques can be provided on the surface of the coldest chip (B). Alternatively, cooling by an air stream may be provided.

Furthermore, the cooled chip (B) is provided with return channels, the cross-section of which may be designed to be so small that the residence time of the sample is minimized during the return from chip C to chip A and while in chip B. Hence, the residence time will not be sufficient to raise the temperature of the sample, when being returned to chip A, to the temperature of chip B; with the sample, to a large extent, remaining at the temperature of chip C. The return channels can be additionally thermally insulated from chip B.

The use of an optically transparent material for the connecting chip, for example Pyres (borosilicate glass) glass, permits an optical in situ detection of reactants in the sample by way of a fluorescence detection of an added dyestuff, which is of particular interest for purposes of analysis.

According to the invention in a miniaturized temperature-zone flow reactor, the single samples are sequentially injected as drops into a continuous carrier fluid stream which is pumped through the miniaturized temperature-zone flow reactor. The carrier fluid is so selected that the carrier fluid is chemically imiscible with the sample fluid, hencedifferent samples can be processed in sequence. The serial delivery of the sample fluid can be transferred into a parallel two-dimensional array, for example, into a nano-titer plate or into an electrophoresis gel in that the proposed temperature-zone flow reactor is suspended to an x,y-displacement unit. By that unit, the reactor is moved on to a next chamber after a preceding one has been filled with a sample drop. The exit of a drop can be detected by the refraction of a light beam in the sample drop located in the carrier fluid by way of a photometer unit. When there is provided a plurality of flow paths separated from one another on the proposed temperature-zone flow reactor, or when there is operated a plurality of side by side miniaturized temperature-zone flow reactors in the way described above, the mentioned serial transfer of the samples into a parallel array can be realized in a very efficient manner.

BRIEF DESCRIPTION OF THE DRAWINGS

In order that the invention may be more readily understood, reference is made to the accompanying drawings which illustrate diagrammatically and by way of example one schematic embodiment thereof, wherein.

DETAILED DESCRIPTION OF THE INVENTION

Figure 1:
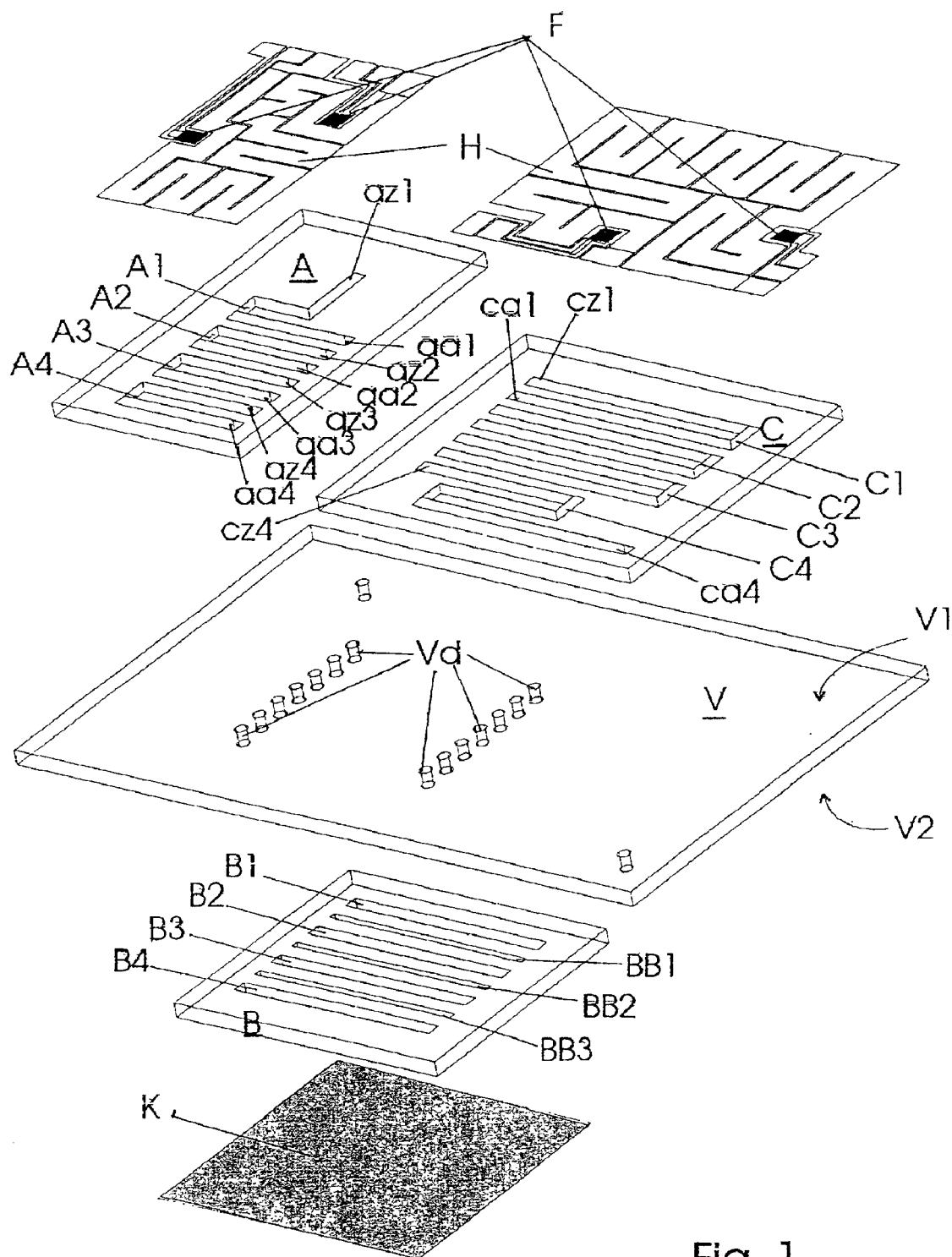
FIG. 1 is an exploded view of an embodiment of a miniaturized temperature-zone flow reactor according to the present invention.

In FIG. 1 a miniaturized temperature-zone flow reactor is shown in an exploded view. For the sake of simplicity, only one closed flow path is shown in the example, the course of which will be described in the following. To begin with, there is provided a first substrate chip A which, in the example, has the external dimensions (length, width, thickness) of (8×13×0.5) mm and into one side of which channels are inserted that will have a length of 9 mm, a width of 0.536 mm and a depth of 0.380 mm. In the present example, the entire single channel section is to be understood by the here designated length. Said channel section lies, for example, between an inlet opening az2 and an associated outlet opening aa2, so that this channel section holds a volume of 0.9 µl in the present example. Furthermore, a third substrate chip C is provided which, in the example, has the external dimensions (length, width, thickness) of (14×13×0.5) mm and into one side of which channels are inserted that will have a length of 22 mm, a width of 0.536 mm and a depth of 0.380 mm, so that this single channel section holds a volume of 2.26 µL. With respect to the size, here to be understood as length, the same is true as specified with respect to the first substrate chip A. Both mentioned substrate chips A, C are made of a good heat conducting material, silicon in the example, and are in heat-conductive communication with heating elements H which are provided on the entire face of that side which is opposite to the opened channel sides. A temperature which can be controlled and varied, is applied to the heating elements. In the example, the heating elements H are formed by thin-layer heating elements that are of meandering shape and are directly deposited on the substrate chips. Furthermore, thin-layer temperature sensors F are integrated into the substrates, the sensors being capable of controlling each respectively set temperature. The inlet openings and the outlet openings az1 . . . aa4 of the first substrate chip A and the inlet openings and the outlet openings cz1 . . . ca4 of the third substrate chip C, are in a spaced apart relation, arranged side by side, on one side of the respective substrate chip, on a section of the latter, substantially linearly. They are, via that surface, which is opposite to the heating elements H, deposited upon a first face VI of a connecting chip V above and connected to the latter. The connection is obtained by anodic bonding in such a manner that the inlet openings and the outlet openings are captured by passage openings Vd which are provided on the connecting chip V. The connecting chip V, which is of poor heat conductivity, is a pyrex-glass chip of 1.1 mm thickness used in the present example.

The rear side connection of the partial paths A1 . . . An and of the partial paths C1 . . . Cn is established by a second substrate chip B that is bonded to the second face V2 of the connecting chip V. A silicon chip with the dimensions (12×10×0.5) mm is used for the second substrate chip B in the present example, into which longitudinally extending channels are inserted of a length of 9 mm, a width of 0.536 mm, and a depth of 0.38 mm. These n channels; four in the example: B1 . . . B4; receive the respective flow from A to C. Furthermore, n-1 channels, three in the example: BB1 . . . BB3; are respectively provided in-between the channels B1 . . . B4, which take over the reflux from C to A. The return channels are so embodied that they are initially formed by indentations having a length of 9 mm, a width of 0.26 mm and a depth of 0.184 mm, so that they are capable of holding a volume of 0.2 µl, whereas the forward conducting channels B1 . . . B4 hold a volume of 0.9 µl. Furthermore, it is advantageous within the scope of the invention to provide the return channels BB1 . . . BB3 of the substrate chip B with a thermally insulating lining relative to the wall material of the substrate chip B. This can be carried out in the assembled state of the temperature-zone flow reactor by passing a polymer through the channels, so that the polymer forms deposits on the walls of the channels. The return channels have a reduced cross-section, so that the velocity of flow through the return channels (BB1 . . . BBn-1) is increased at least by threefold relative to that through the channels (B1 . . . Bn). At a passage velocity of flow of 1 µl/min and at correspondingly sized dimensions of the channel sections within the respective substrate chips, the separation, which is described in the present example, of the one closed flow path into three partial paths A1 . . . A4, B1 . . . B4, BB1 . . . BB3, and C1 . . . C4 results in a residence time for the single samples in the respective channel sections of the substrate chips A, B, C and, thus, by establishing residence times, also establishes the corresponding preselected temperatures per passage through the respective partial section, as follows: zone A=55 sec., zone B=55 sec. in the forward flow channel, and zone B=14 sec. in the return channel of zone C=140 sec. Since the velocity of flow is considerably increased in the return channels BB1 . . . BB3 and the channels, as specified above, are additionally thermally insulated, preferably relative to the material of the substrate chip B, the sample temperature in the return flow is reduced only insignificantly relative to its temperature entering the section C. Otherwise, the substrate chip B is kept to the required temperature by external cooling obtained in that it is brought into contact with a cooling unit K or by depositing a Peltier element in thin-layer technique. Alternatively, cooling in an air-stream is feasible.

Due to the fact that the connecting chip (V) is formed of an optically transparent material, for example, Pyrex (borosilicate glass) glass, and that, according to the arrangement of the substrate chips A, C, free access remains between the substrate chips, optical in situ detection of the reactants in the sample by way of a fluorescence detection an added dye-stuff is possible, when is of particular advantage for the purpose of analysis.

In order to perform a PCR, the three temperature zones are so designed in the example that they allow the performing of the denaturation of a double-stranded DNS in the range of the substrate chip A, the attaching of primers to a single-stranded DNS (annealing) in the range of the substrate chip B, and a primer extension by way of TAQ-polymerase in the range of the substrate chip C. The temperatures measured in the present example are: zone A: 95° C.; zone B: 55° C.; zone C: 72° C. The temperatures in the zones can be kept constant, to within 1° C., by providing a connection to an external proportional controller. The carrier fluid of the embodiment described passes each of the mentioned zones four times. Furthermore, the first inlet path formed by the partial path az1 to aa1 in the first substrate chip A and the last outlet path formed by the partial path cz4 to ca4 in the third substrate chip B are designed longer than the remaining n partial channels provided on the respective substrate chips, in order to permit the PCR a longer reaction time for the processes at the inlet and at the outlet of the temperature-zone flow reactor.

At the outlet, shown here as ca4, a photometer unit (not shown) permits the segmenting of the sample fluid and the use of the miniaturized temperature-zone flow reactor, either by a multiple parallel use of the temperature-zone flow reactor as described in FIG. 1, or by providing, on a respective one of the substrate chips A, B, C, a plurality of closed flow paths subdivided into three zones according to the invention for the transfer and parallel delivery of the samples, as above described.

Figure 2:
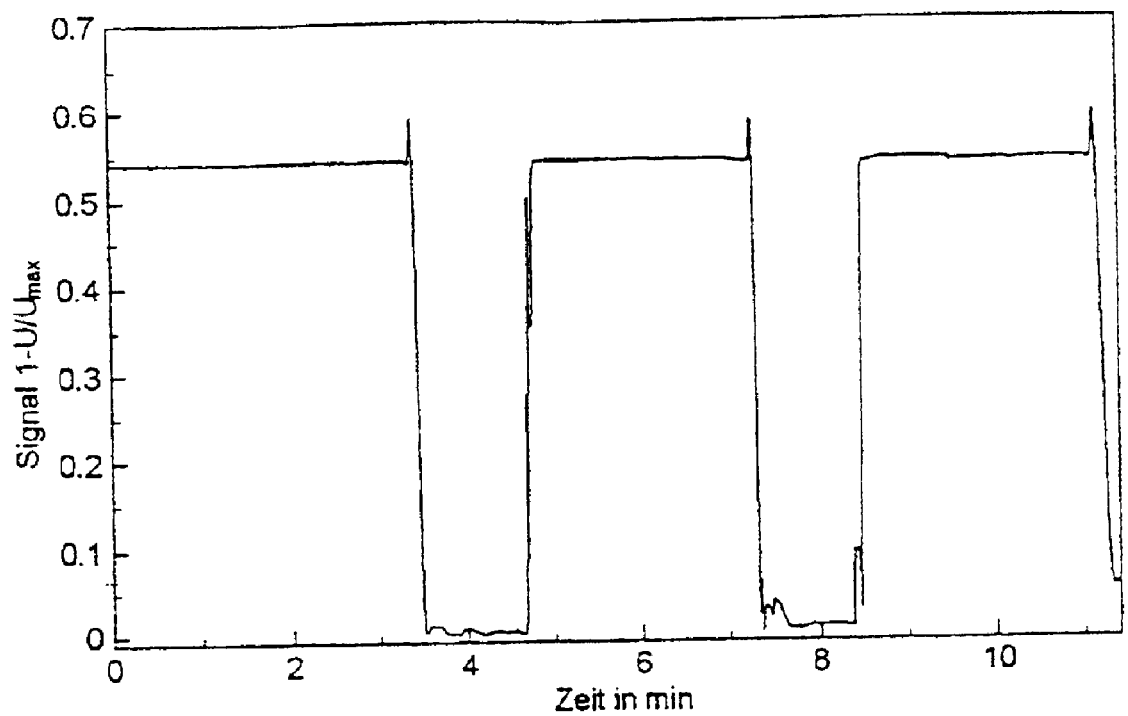
FIG. 2 shows a signal of a photometer at the exit of the miniaturized temperature-zone flow reactor, signifying that there is no mixing of the single sample ranges during the flow passage.

FIG. 2 shows and example of the signal of such a photometer at the outlet of the miniaturized temperature-zone flow reactor, clearly showing that there is no mixing of the single sample ranges during the flow passage, provided that a liquid, chemically non-miscible with the sample, such as, in particular, oil, is used as a carrier medium for the sample transport. In the example, a dyed sample was used for testing.

What is claimed is:

1. A miniaturized temperature-zone flow reactor, for use in thermally controlled biochemical and molecular-biological processes, said reactor comprising:

at least one closed, multifold, winding flow path, each comprising a plurality of microstructured channels and at least three partial paths, in a planar substrate;

three substrate chips, made from a material having a thermal conductivity at least as high as that of silicon;

each one of said three substrate chip having at least one face, of which at least a portion thereof contains some of said plurality of microstructured channels;

heating elements, on each of said three substrate chips, for providing heating to at least that portion of each said substrate chip containing some of said plurality of microstructured channels;

a first one of said substrate chips having a plurality of inlets thereon, corresponding in number to a number of flow paths on said substrate chip;

a third one of said substrate chips having a plurality of outlets thereon, corresponding in number to a number of flow paths on said substrate chip;

each of said three substrate chips having n channel sections, each of said n channel sections having an inlet opening and an outlet opening, such that said inlet opening and said outlet opening of each said channel are linearly positioned adjacent to one another on one side of a section of each said substrate chip;

a connecting chip, having a thermal conductivity that is lower than the thermal conductivity of said substrate chips, and is at least as low as that of borosilicate glass;

said connecting chip further having:

a first face, opposite to said heating elements, on which said first substrate chip and said third substrate chip are positioned, said first substrate chip and said third substrate chip being spaced apart from one another on said first face of said connecting chip;

a plurality of first passage openings on its said first face, each said first passage opening leading to a corresponding passage extending through said connecting chip;

a plurality of second passage openings, corresponding in total number to the total number of said plurality of first passage openings, in a second, opposite face of said connecting chip, such that each said second passage opening is in fluid transporting communication with a corresponding one of said first passages; and still further such that:

said inlet openings and said outlet openings of said first substrate chip and said third substrate chip are in fluid transporting communication with said first passage openings; and said second passage openings of said connecting chip are connected to one another by some of said microstructured channels in a second one of said three substrate chips, to form said partial paths on said second substrate chip, such that one closed flow path, having n passages through said three substrate chips is formed.

2. The miniaturized temperature-zone flow reactor according to claim 1, wherein return channels of said partial paths of said second substrate chip have a reduced cross-section for fluid flow relative to other ones of said n channels, such that a fluid flow velocity through said return channels is at least three times a fluid flow velocity through said other ones of said n channels.

3. The miniaturized temperature-zone flow reactor according to claim 2, wherein said return channels comprise a thermally insulating lining, which insulates said return channels relative to said second substrate chip.

4. The miniaturized temperature-zone flow reactor according to claim 3, wherein said thermally insulating lining is a polymer.

5. The miniaturized temperature-zone flow reactor according to claim 1, wherein said connecting chip is made of an optically transparent material.

6. The miniaturized temperature-zone flow reactor according to claim 1, wherein said first substrate chip has a first inlet path, and said third substrate chip has a last outlet path, both of which paths are longer than other n partial channels on the substrate chips.

7. The miniaturized temperature-zone flow reactor according to claim 1, wherein said microstructured channels and said partial paths of said at least one closed, multifold, winding flow path of said miniaturized temperature-zone flow reactor are sufficiently large to accommodate a volume of reactants fed to the reactor that are mixed together with a volume of a carrier that is chemically non-miscible with the reactants, for transport through the reactor.

8. The miniaturized temperature-zone flow reactor according to claim 7, wherein said carrier is oil.

9. The miniaturized temperature-zone flow reactor according to claim 1 wherein said second substrate chip has a second surface, facing away from said connecting chip, which second surface is in heat-conductive communication with a cooling element, distributed over an entirety of said second surface of said second substrate chip, for cooling said second substrate chip to a temperature lower than a temperature of said first and third substrate chips.

10. The miniaturized temperature-zone flow reactor according to claim 1, wherein said three substrate chips are made from silicon.

11. The miniaturized temperature-zone flow reactor according to claim 1, wherein said connecting chip is made from borosilicate glass.

* * * * *